United States Patent
Mulcahy et al.

(10) Patent No.: US 8,761,778 B2
(45) Date of Patent: Jun. 24, 2014

(54) LOCATION BASED CONTACT ROUTING

(71) Applicant: Bandwidth.com, Inc., Raleigh, NC (US)

(72) Inventors: James Mulcahy, Raleigh, NC (US); Anders Brownworth, Cambridge, MA (US)

(73) Assignee: Bandwidth.com, Inc., Raleigh, NC (US)

( * ) Notice: Subject to any disclaimer, the term of this patent is extended or adjusted under 35 U.S.C. 154(b) by 0 days.

(21) Appl. No.: 14/048,456

(22) Filed: Oct. 8, 2013

(65) Prior Publication Data

US 2014/0038617 A1 Feb. 6, 2014

Related U.S. Application Data

(63) Continuation of application No. 13/275,066, filed on Oct. 17, 2011.

(60) Provisional application No. 61/393,423, filed on Oct. 15, 2010.

(51) Int. Cl.
   *H04W 40/00* (2009.01)
   *H04W 40/04* (2009.01)
   *H04W 40/20* (2009.01)
   *H04W 40/34* (2009.01)
   *H04W 48/00* (2009.01)
   *H04W 64/00* (2009.01)
   *H04W 4/02* (2009.01)

(52) U.S. Cl.
   CPC ............ *H04W 40/005* (2013.01); *H04W 40/04* (2013.01); *H04W 40/20* (2013.01); *H04W 40/34* (2013.01); *H04W 48/00* (2013.01); *H04W 64/00* (2013.01); *H04W 4/025* (2013.01)
   USPC ..... 455/445; 455/440; 455/456.1; 455/456.3; 455/456.5; 455/457

(58) Field of Classification Search
   CPC ... H04W 40/005; H04W 40/04; H04W 40/20; H04W 40/34; H04W 48/00; H04W 64/00; H04W 4/23; H04W 4/025
   USPC ......... 455/445, 440, 456.1, 456.3, 456.5, 457
   See application file for complete search history.

(56) References Cited

U.S. PATENT DOCUMENTS

| | | | |
|---|---|---|---|
| 7,215,753 B2 * | 5/2007 | Parra Moyano et al. . | 379/211.02 |
| 7,319,744 B1 * | 1/2008 | Arnold et al. ............ | 379/201.03 |
| 2004/0202304 A1 * | 10/2004 | Weaver .................... | 379/211.02 |
| 2007/0032225 A1 * | 2/2007 | Konicek et al. ............... | 455/417 |
| 2009/0028318 A1 * | 1/2009 | Bhogal et al. ............. | 379/211.02 |
| 2009/0046842 A1 * | 2/2009 | Allen et al. .............. | 379/201.01 |

(Continued)

*Primary Examiner* — Khai M Nguyen
(74) *Attorney, Agent, or Firm* — Gregory Stephens

(57) ABSTRACT

The location of a mobile terminal associated with a user is determined using GPS or by monitoring signals generated and received by the mobile terminal, etc. Coordinates for at least one hot spot defined by the user are accessed to determine whether the location of the mobile terminal is within the hot spot. When an incoming contact is received for the user, a determination is made as to whether there are any contact routing rules associates with the user. If so, the record of contact routing rules associated with the user is accessed. If the record of contact routing rules includes at least one contact routing rule assigned to a hot spot, the contact is routed according to the at least one contact routing rule, based on whether or not the mobile terminal is determined to be within the hot spot.

18 Claims, 4 Drawing Sheets

(56) References Cited

U.S. PATENT DOCUMENTS

2009/0247188 A1* 10/2009 Ridley et al. .............. 455/456.2
2009/0299809 A1* 12/2009 Dettori et al. .................. 705/9
2010/0189096 A1* 7/2010 Flynn et al. ................... 370/352
2012/0260317 A1* 10/2012 Horstemeyer ................... 726/4

* cited by examiner

LOCATION BASED CONTACT ROUTING

CROSS-REFERENCE TO RELATED APPLICATION

This application claims priority to U.S. patent application Ser. No. 13/275,066, filed Oct. 17, 2011, entitled "Systems and Methods for Implementing Location Based Call Routing," which claims priority to U.S. Provisional Patent Application No. 61/393,423, filed Oct. 15, 2010, entitled "Location Based Call Routing," both of which are incorporated herein by reference.

TECHNICAL FIELD

The present invention relates generally to routing of communications in a telecommunications network. In particular, the present invention relates to location based contact routing in a telecommunications network.

BACKGROUND OF THE INVENTION

In a telecommunications network, "call routing" or "call forwarding" refers to a calling feature that allows a telephone user to have incoming calls routed to an alternate phone number based on certain predefined user-specified rules. For example, a person may elect to have all calls to a first phone number (e.g., a home phone number) routed to a second phone number (e.g., a work phone number) during the hours of 9:00 am and 5:00 pm. Some existing implementations of call routing or forwarding features require the user (i.e., the called party) to manually update or change the call routing rules to reflect modifications in the user's schedule. By way of illustration, if the person in the prior example will not be present at work at some point during the hours of 9:00 am and 5:00 pm on a given day and still wants to receive calls to the user's home or work phone numbers, the person will need to update the call routing rules to specify a third phone number (e.g., a cell phone number) to which the incoming calls are to routed.

Another example of a call routing feature is sometimes referred to as a "find-me/follow-me" feature. In this type of feature, generally implemented in a Voice over IP portion of a telecommunications network, calls placed to a user may be routed to one of a number of network terminals depending upon which terminal the user is currently logged-in to. For example, the user may associate a phone number or user name with multiple network addresses, each corresponding to a different network terminal (e.g. home computer, work computer, mobile device, etc.) and a call routing application may be configured to determine which of the terminals the user is logged-in to and to route calls to that terminal. In these types of systems, the called party is required to manually provide an indication of the location to which a call is to be routed at a given time, e.g., by logging-in to a network terminal.

Therefore, what is needed is a more efficient implementation of a contact routing feature that can automatically (i.e., without manual user interaction) be adjusted based on the location of the contacted party.

SUMMARY OF THE INVENTION

The present invention provides systems, devices and methods for implementing location based contact routing in a telecommunications network. The described embodiments involve determining a location of a mobile terminal associated with a user, accessing coordinates for at least one hot spot defined by the user and determining that the location of the mobile terminal is within the hot spot. For example, the location of the mobile terminal may be determined by monitoring the location of the mobile terminal using a global position system or by monitoring signals generated and received by the mobile terminal to triangulate the position of the mobile terminal. The location of the mobile device is monitored over time and when it is determined that the mobile terminal has moved to a new location, the coordinates for the hot spot(s) are accessed so that a determination can be made as to whether the new location of the mobile terminal is within the hot spot(s).

The user may define hot sports by manipulating a graphical user interface of an application program module. For example, the user may define the hot spot by identifying a pin point on an interactive map and defining a circle having a radius, or any other polygon having at least one dimension, that extends from the pin point on the interactive map. As another example, the user may define the hot spot by inputting an address and defining a dimension that extends from the input address. Geographical coordinates may be determined and stored for each defined hot spot.

The user may also define at least one contact routing rule assigned to each hot spot. For example, a contact routing rule assigned to a hot spot may specify that an incoming contact is to be routed to a designated device, or that the contact is to be routed to one or more designated devices simultaneously. As another example, a contact routing rule assigned to a hot spot may specify that an incoming contact is to be routed to a first device and, if the first device does not respond to the contact within a period of time, then the contact is to be routed to a second device. Contact routing rules may be defined on a per-contact basis. Default or standard contact routing rules may also be assigned to a hot spot. Contact routing rules may also be defined for groups of devices to specify contact routing and handling preferences to be applied when one or more devices of a defined group are determined to be within one or more hot spots.

When an incoming contact is received for the user, a determination is made as to whether there are any contact routing rules associated with the user. If so, the record of contact routing rules associated with the user is accessed. If the record of contact routing rules includes at least one contact routing rule assigned to a hot spot, the contact is routed according to the at least one contact routing rule, based on whether or not the mobile terminal is determined to be within the hot spot. The incoming contact may be a phone call, video call, text message, multimedia message or any other type of contact. These and other aspects, features and embodiments of the present invention will be described herein.

DETAILED DESCRIPTION OF EXEMPLARY EMBODIMENTS

Figure 1:
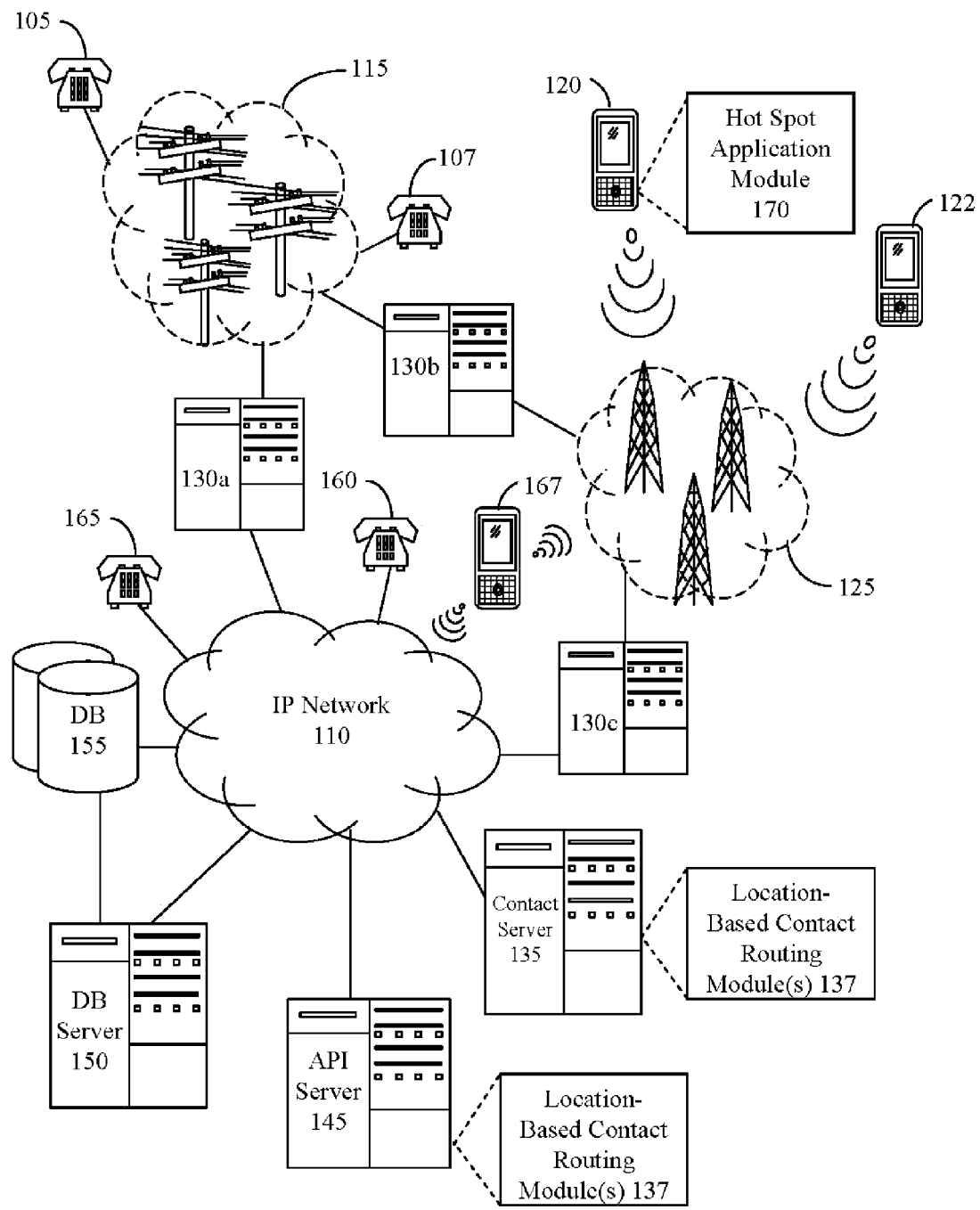
FIG. 1 is a block diagram illustrating an exemplary system for implementing location based contact routing in a telecommunications network, in accordance with certain embodiments of the invention.

The present invention provides systems and methods for making contact routing decisions based on a user's physical presence at or near a location. As used herein, the term "contact" is intended to refer to any type of call (e.g., phone call, video call, etc.) or message (e.g., text message, multimedia message, etc.) that is directed to a particular device or terminal associated with a phone number, network address, or the like. The user defines one or more "hot spots," each of which represents a geographic area. The user may also specify the contact routing decisions, or types of contact routing decisions, that are to be made when the user is physically present within each hot spot. Alternatively, default or standardized contact routing decisions can be configured for each hot spot. A user's physical presence within a defined hot spot is detected based on signals from the user's mobile phone or other device (collectively referred to herein as a "mobile device" or "mobile terminal").

In some embodiments, the user may define a hot spot by interacting with an application (referred to herein as a "hot spot application") that incorporates interactive map functionality, GPS-based functionality or some other location based service functionality. Preferably, the hot spot application runs on the user's mobile device. However, it is also possible that the hot spot application may be run on another device, such as the user's desktop or laptop computer, a network server, etc. For example, the user may manipulate the graphical user interface of the hot spot application to draw or otherwise define the boundaries of a hot spot. The hot spot application may then translate this visual representation of the hot spot into geographic coordinates or the like. These and other methods for allowing a user to define a hot spot will occur to those of skill in the art.

By way of example, a user may define a hot spot labeled "work" by identifying the address of her office on an interactive map and by specifying a radius or other area (or even a three dimensional space) around that address. Similarly, the user may define a hot spot labeled "home" by identifying the user's home address on the interactive map and by specifying a radius or other area (or even a three dimensional space) around that address. The user may then specify one or more contact routing rules that are to be followed whenever the user is determined to be present within either of the hot spots (or outside any of the hot spots). For example, the user may specify that any contact to any of the user's phone numbers (mobile device, home phone, work phone) should be routed to: (a) the users work phone when the user is within the "work" hot spot, (b) the users home phone when the user is within the "home" hot spot, and (c) the users mobile device when the user is not within either of the "work" or "home" hot spots. According to this example, when the user is at work, contacts directed to the user will ring through to the user's desk phone. When the user goes to lunch and the user is not within either the "work" or "home" hot spots, the user's contacts will be automatically routed to the user's mobile device.

Contact routing decisions according to the present invention are made based on automatic detection of the user's location. Thus, no user interaction is required (beyond initial hot spot and rule configuration) to make the system work, other than for the user to have a mobile device within in the user's possession. In other words, unlike prior art systems, the user does not need to manually change routing preferences or manually provide an indication of his/her location, each time he/she wants contacts to be routed to a different device. Also, the user does not need to specify contact routing decisions based on fixed time intervals (e.g., route all contacts to work phone during hours of 9:00 AM to 5:00 PM and to mobile device outside of those hours).

The system may be configured to detect and determine the user's location in several different ways, depending on the capabilities of a user's mobile device. For example, hot spots may be saved on the user's mobile device or on a device within the network. If the hot spots are saved on the mobile device, the mobile device may be configured to monitor for significant changes in its location (e.g., using location based services, such as GPS, etc.) and compare each newly detected location against the coordinates of the defined hot spots to determine if the mobile device has moved into or out of a hot spot. If so, the mobile device notifies the network of the location change and the network updates the contact routing settings for that user.

If the mobile device is not capable of detecting and determining its own location, hot spots may instead be stored within the network. For example, hot spots may be stored within a database accessible by a contact server and the like. The network may be configured to watch for changes in the device's location based on signals generated from the device and/or other device(s) with which the mobile device communicates (e.g., base stations, routers, repeaters, etc.) and compare such changes against the hot spot settings for that mobile device. If it is determined that the mobile device has transitioned into or out of a defined hot spot, the network updates the contact routing settings for that user.

In addition to the simple contact routing rules described above, more complicated contact routing rules are also possible. For example, the user may specify a hierarchy of devices, such that contact are to be first routed to a particular device when the user is present in within a particular hot spot, but if a contact is not answered with a certain number of rings or a certain time interval it should be routed to a second device, and so on. In such a scenario, it is envisioned that the user may be present within the user's defined "work" hot spot but not actually sitting in the user's office. The user may specify that contact to the user when within the "work" hot spot will first ring the user's office phone and, if unanswered, will then be routed to user's mobile device. In some cases, a user may wish to have contact routed to multiple devices simultaneously when the user is within a particular hot spot (or is not within a hot spot).

In some embodiments, the hot spot application may be configured to not allow overlapping hot spots. For example, when the user graphically adjusts the size of a hot spot, the hot spot application may be configured to not allow that hot spot to grow large enough to overlap another defined hot spot, or may automatically resize other hot spots to accommodate the desired change. The hot spot application may also be configured such that any new hot spot added to the map must be placed outside the bounds of all existing hot spots. Similarly, if the entire map is covered with one or more hot spots, the hot spot application may not allow the creation of new hot spots.

In other embodiments, overlapping hot spots may be allowed. In a simple case, when the user is determined to be within an area that is covered by multiple hot spots, the first detected hot spot will be used to determine the contact routing. In a more sophisticated case, a user's contact routing preferences (e.g., contact my mobile phone, contact my office phone) can be overlapped in an additive or subtractive manner to build up more complex routing scenarios. For example, a user might define a "work" hot spot that encompasses the user's entire office building and a smaller "office" hot spot encompassing his/her personal office or desk space. In an additive manner, the user could specify that when the user is within the "work" hot spot, all contacts to the user should be routed to the user's mobile phone and if the user is also within the "office" hot spot contacts should also be routed to the user's desk phone. Alternatively, in a subtractive manner, the user could specify that when the user is within the "work" hot spot, all contacts to the user should be routed to the user's mobile phone—unless the user is also within the "office" hot spot, in which case contacts should instead be routed to the user's desk phone (and not the user's mobile phone).

In some embodiments, a user may be given the option to group and separate hot spots for common/individual application of contact routing rules. For example, if the user has defined one hot spot as "downtown office" and another hot spot as "midtown office", the user may choose to group them together for treatment as a single "work" hot spot and then associate one or more contact routing rule(s) with that hot spot. At some point later, the user may choose to separate the "work" hot spot into the "downtown office" and "midtown office" hot spots and apply different contact routing rule(s) to each one. Similarly, hot spots and contact routing rules can be defined for groups of users. Whenever one or more members of a group of users are determined to be within (or outside) a hot spot, specified contact routing rules may be applied.

As will be appreciated by those of skill in the art, the location based contact routing systems and methods of the present invention may be implemented in a packet-based network or in a packet-based segment of a telecommunications network that includes packet-based and non-packet-based segments (i.e., a hybrid network). Exemplary embodiments of the present invention may be implemented in an IP network, which may employ "Voice over IP" and other messaging or contact technologies. Voice over IP, also referred to as "VoIP," is a general term of a family of methodologies, protocols, and transmission technologies for delivery of voice communications and multimedia sessions over IP networks. Those skilled in the art will appreciate, however, that the principles of the present invention may be applied to any packet-based or frame-based communication protocols and technologies.

Location based contact routing may be implemented through one or more software modules executed by one or more network servers (e.g., contact server, API server, database server), possibly in cooperation with one or more hot spot applications executed by a mobile device. Calls originating from or destined for the Public Switching Telephony Network (PSTN) (or other non-IP segments of a telecommunication network) may be routed to and from the network servers by appropriate media gateways, session border controllers, etc. These devices are collectively, and generally, referred to herein as "gateway devices."

Reference will now be made in detail in various and alternative exemplary embodiments and to the accompanying figures, in which like numerals represent substantially identical elements. Each exemplary embodiments in provided by way of explanation, and not as a limitation. It was be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

FIG. 1 depicts an exemplary system 100 for implementing location based contact routing in a telecommunications network. The exemplary system 100 may include one or more terminals 105 and 107 connected to the PSTN 115 and a gateway device 130a connecting the PSTN 115 to an IP network 110 (e.g., the Internet or a private IP network, etc.). The exemplary system 100 may also include one or more mobile terminals 120 and 122 in communication with a radio access network 125 and one or more gateway device 130b and 130c connecting the radio access network 125 to the PSTN 115 and the IP network 110, respectively. One or more network servers (e.g., contact server 135, API server 145, and database server 150), one or more database 155 and one or more terminal 160 and 165 may also be connected to the IP network 110. One or more terminals 167 (e.g. mobile phone, computer, etc.) may be in communication with both the IP network 110 and the radio access network 125.

As used herein, a "terminal" refers to any wireline, wireless or mobile device for initiating and/or receiving contacts, including traditional rotary terminals, pulse-activated DTMF terminals, cell phones, personal computers and the like. As will be appreciated, terminals can vary in connectivity, functionality and other characteristics and features. The present invention contemplates that one party (the "contacting party") will use a first terminal (e.g. terminal 105) to call another party (the "contacted party"), who uses a second terminal (e.g., terminal 107, terminal 120 or terminal 160). As mentioned, a contact can comprise any voice or other type of media communication. For example, a contact may be a non-voice communication including but not limited to a text message (e.g., as specified by the well known Short Messaging Service (SMS)), a multimedia message (e.g., as specified by the well known Multimedia Messaging Service (MMS)), and other types of non-voice communications that would be known to those skilled in the art.

As is well known in the art, contacts originating from, terminating in or passing through a non-IP network (e.g., the PSTN 115 or the radio access network 125) may pass through one or more gateway devices 130a-c, which, among other functions, convert digital media streams between disparate types of telecommunications networks. Gateway functionality is not unique to the present invention and is therefore not explained in further detail herein. Of course, the present invention also contemplates end-to-end VoIP calls and other end-to-end IP-based contacts between terminals (e.g., terminals 160 and 165) connected to the IP network 110 that would not require a gateway device 130a-c.

In accordance with the present invention, contact between terminals are managed by the contact server 135. FIG. 1 depicts only a single contact server 135 for simplicity, but multiple contact servers 135 may be deployed in a scaled system. In the context of the present invention, a contact server 135 can be a VoIP server or any other processor-driven device that is capable of executing instructions for establishing and/or managing call connections between terminals and for implementing the inventive location based contact routing as described herein. The contact server 135 may also be an SMS server, an MMS server or any other processor-driven device that is capable of executing instructions for routing other contacts (other than calls) between terminals and for implementing the inventive location based contact routing as described herein. The contact server 135 will thus include components such as a network interface for connecting to the IP network 110 and communicating with the resources thereof, a memory component for storing computer-executable instructions (e.g., software code) and data, and a processor for executing computer-executable instructions. Other components and the basic operation of processor-driven devices are well known in the art and are therefore not discussed herein.

In certain embodiments where the contact server 135 is a VoIP server, it may execute the Linux operating system and the FreeSWITCH communications platform. In such an environment, one or more "location based contact routing" modules 137, which include computer-executable instructions for performing the location based contact routing methods described herein, may be implemented as an application, or a component of an application, built on the FreeSWITCH platform. Examples of such applications include JSON and OpenSSL. In other embodiments, the contact server 135 may execute any other suitable operating system and contact management software and the location based contact routing module(s) 137 may be implemented as a component thereof or as a stand-alone application. The contact server 135 may also execute speech recognition software, such as PocketSpynx or any other suitable program, for detecting speech commands transmitted by various terminals. The contact server 115 may also execute software module(s) for generating call records or the like.

Call records and other data (e.g., details regarding call connections, call durations, dates and times of other contacts, and various actions taken by the contacting party and contacted party) may be stored in the local memory of the contact server 135, which may include a RAM, hard disk, removable disks, tape arrays, or any other computer readable medium. Alternatively, or additionally, the contact server 135 may communicate with a database server 150 for storing call records and/or other data in one or more database 155. The database(s) 155 may be connected to the database server 150 and/or the IP network 110. The database server 155 can be implemented using PostGreSQL running on the Linux operating system, for example.

In some embodiments, functionality for implementing the inventive location based contact routing may be distributed among multiple servers, such as the contact server 135, the API server 145 and the database server 150. For example, the API server 145 (or other web server) may interact with hot spot application modules 170 executed by certain mobile terminals 120, 122 and 167, such as smart phones, personal computers, laptop or tablet computers or other computing devices, to specify hot spots and contact routing rules and to determine changes in terminal location. Thus, the API server 145 may collect data from a mobile terminal 120 and may send data and messages to the mobile terminal 120. The API server 145 may then communicate with the database server 150 to store a record of contact routing rules associated with the user of the mobile terminal 120, which can be accessed by the contact server 135 when making contact routing decisions for that user. For simplicity's sake, FIG. 1 depicts one contact server 135, one API server 145 and one database server 150, but multiple of each or some of these devices can be used to implement a more scalable system.

Figure 2:
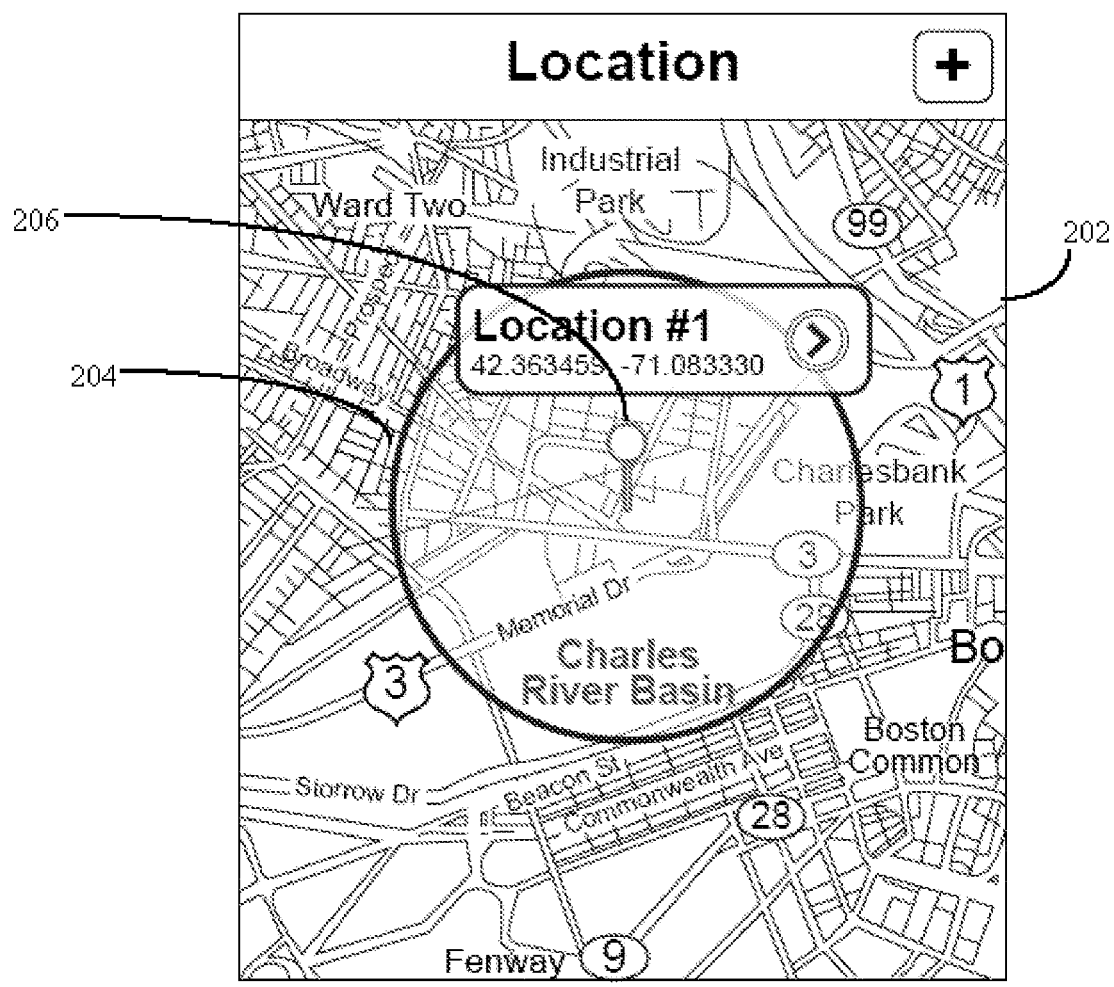
FIG. 2 is an illustration of an exemplary user interface for a hot spot application according to certain embodiments of the invention.

FIG. 2 is an illustration of an exemplary graphical user interface 200 for a hot spot application module 170 according to certain embodiments of the invention. As shown, the interface displays an interactive map 202 and allows the user to graphically define the boundary of a hot spot 204 by manipulating the graphical user interface 200. In the embodiment illustrated in FIG. 2, the user can define a hot spot by identifying a pin point 206 (also referred to as "dropping a pin") on a particular map location and then increase or decrease the radius of a circle around the pin point 206 to define the boundary of the hot spot 204. In other embodiments, the user may define a hot spot using any polygonal shape that surrounds or includes the pin point 206. Also, rather than dropping a pin on an interactive map, the user may input an address or geographic coordinates of a particular location and then specify a radius or other area around or including that address or the geographic coordinates.

A hot spot may also be defined in terms of three dimensional space. As an example, by incorporating a third dimension such as height, the different hot spots may be defined for different floors of the same building. In some embodiments, after defining a hot spot, the user may be prompted to enter contact routing rules associated with the defined hot spot 204. The user can define the contact routing rules as outlined above. This or any other suitable hot spot application interface 200 may be used in accordance with the present invention.

As described above, the hot spot application module 170 may be executed on the user's mobile device. Alternatively, a hot spot application module 170 may be hosted on a network server and accessed via a web browser. In still other embodiments, a hot spot application module 170 may be executed locally on the user's desktop, laptop or other computing device and the hot spot coordinates may be transmitted to the appropriate network devices.

Figure 3:
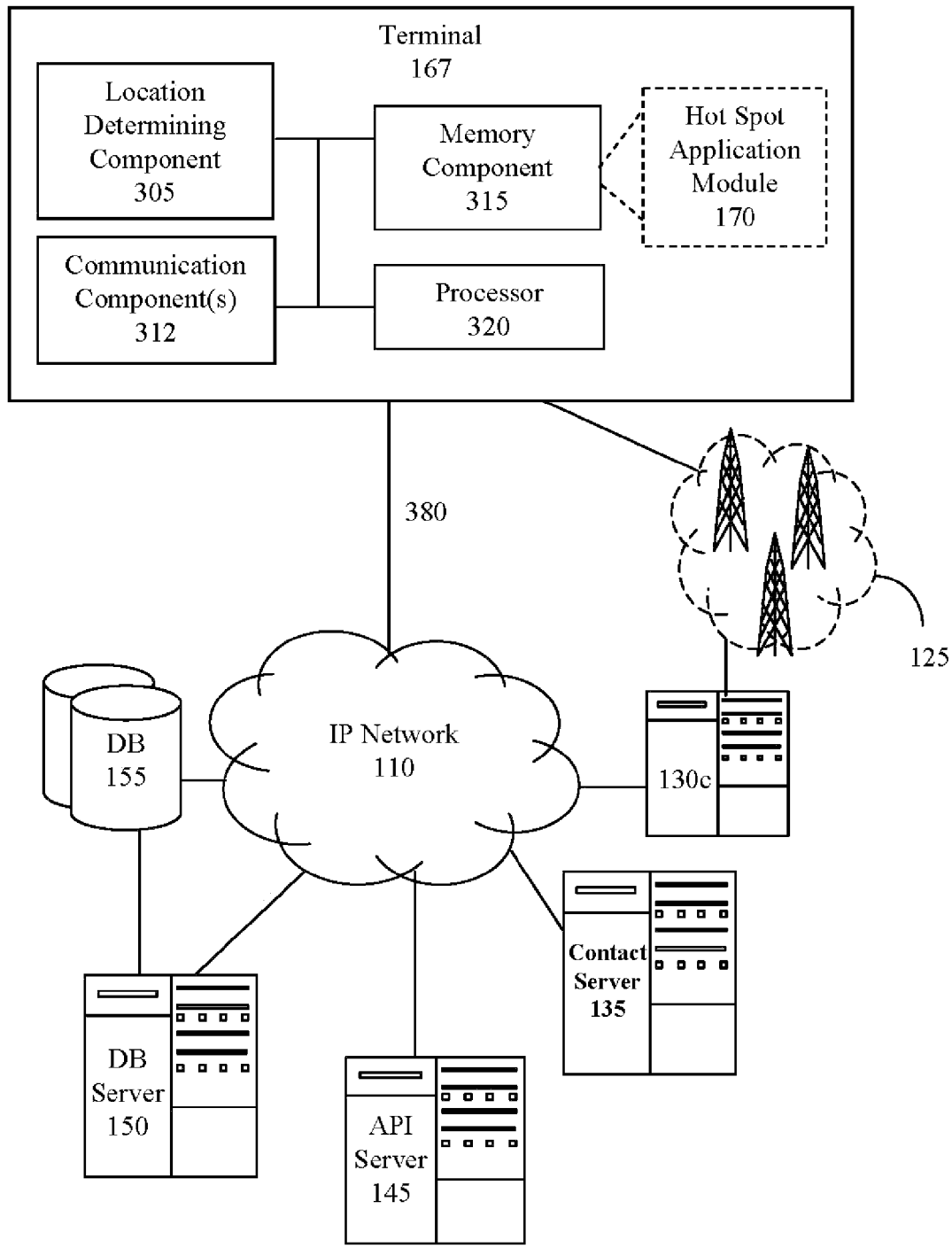
FIG. 3 is a block diagram illustrating an exemplary terminal for implementing location based contact routing in an exemplary telecommunications network, in accordance with certain embodiments of the invention.

FIG. 3 depicts an exemplary terminal 167 for implementing location based contact routing in an exemplary telecommunications network 300, in accordance with certain embodiments of the invention. In the embodiment illustrated in FIG. 3, the exemplary terminal 167 is a mobile device. The exemplary terminal 167 includes components such as a location determining component 305, communication components 312 that allow the terminal to communicate over one or more networks, a memory component 315 for storing computer-executable instructions (e.g., software code, such as the exemplary hot spot application module 170) and data, and a processor 320 for executing computer-executable instruction. Other components and the basic operation of processor-driven devices are well known in the art and are therefore not discussed herein relative to the exemplary terminal 167. As illustrated in FIG. 3, the terminal 167 may be in communication with one or more servers (e.g., contact server 135, API server 145, and database server 150) connected to the IP network 110, either through a direct connection to the IP network 110 or via the radio access network 125 and gateway device 130c.

By way of example, the communication components 312 may comprise a network interface or the like for permitting the terminal 167 to communicate over the IP network 110. The communication link between the terminal 167 and the IP network 110 may be wired or wireless. The communication components 312 may further comprise a radio transceiver or the like for permitting the terminal to communicate over the radio access network 125. Those skilled in the art will appreciate that the communication components 312 may also or alternatively comprise other interfaces or devices for allowing the terminal 167 to communicate over other types of networks not shown in FIG. 3. The operation of the communication components 312 may be driven by the processor 320. The communication components 312 interact with the location determining component 305 and the hot spot application module 170 so that location information and contact routing rules and similar information can be communication between the terminal 167 and the one or more network servers 135, 145, 150, as previously described.

The location determining component 305 may comprise various hardware, software and/or firmware elements for determining the location of the terminal 167. For example, the location determining component 305 may include a GPS chip and associated software or firmware for monitoring the location of the terminal 167 using a global positioning system. Alternatively, or in addition, the location determining component 305 may comprise software executed by the processor 320 that interacts with the communication component(s) 312 to monitor signals generated and/or received by the terminal 167 when it communicates with other devices (e.g. base stations) in the radio access network 125 or other devices (e.g., access points or routers) in the IP network 110. The signals may provide or may be used to provide an indication of the geographical location of the terminal 167 at a particular time, such as by triangulation or techniques like time difference of arrival (TDOA) or Enhanced Observed Time Difference (E-OTD), etc. The signals may thus permit the terminal 167 to track its own location and maintain a record of that information. The location information, which may be in the form of geographical coordinates, may be stored in the memory component 315 and/or may be communicated to the API server 145 directly through the IP network 110 or via the radio access network 125 and a gateway device 130c.

Alternatively, or in addition, devices in the radio access network 125 or the IP network 110 may be configured to track the location of the terminal 167 and to provide the location information to the terminal 167 and/or the API server 145 and/or another network device. For example, devices in the radio access network 125 may determine the location of the terminal 167 based on the delay of radio signals sent between the terminal 167 and the closest base station(s). In such cases, the geographical position of the terminal 167 is found out through various techniques like triangulation, time difference of arrival (TDOA) or Enhanced Observed Time Difference (E-OTD). Those skilled in the art will appreciate that any other location based service technology may be used in accordance with the present invention. Examples of such other technologies include: Near LBS (NLBS), in which local-range technologies such as Bluetooth, WLAN, infrared and/or RFID/Near Field Communication technologies are used to determine the position of a terminal 167; the use of operator-independent location data provided in telecommunication signaling protocols such as SS7; and Local Positioning Systems such as Co-Pilot Beacon for CDMA networks, Bluetooth, UWB, RFID and Wi-Fi.

The processor 320 may execute computer-executable instructions of the hot spot application module 170 for allowing a user to create and store hot spots, as previously described. In some embodiments, the hot spot application module 170 may be configured to access (e.g., at periodic intervals or in response to a command or request from the API server 145 or contact server 135) hot spot records and location information from the memory component 315 and to determine whether the terminal is within one or more of the defined hot spots. Alternatively, the hot spot application module 170 may interact with the communication components 312 to communicate hot spot records to the API server 145. In such embodiments, the API server 145 may be configured to store hot spot records and location information in a local memory or may pass the hot spot records and location information to the database server 150 for storage in a database 155. Then, at periodic intervals or in response to a command or request from a contact server 135, the API server 145 compares the location of the terminal 167 to the hot spot records to determine if the terminal 167 is within one or more of the defined hot spots.

A hot spot record may include, for example, the coordinates of one or more hot spots. In some embodiments, a hot spot may be defined in terms of a central pin point on a map surrounded by a radius or area (or even a volume) of a certain size. For example, a hot spot record may indicate that for a user's "home" hot spot, the coordinates of the central pin point are 22°54'30"S and 43°11'47"W and the hot spot extends over an area (or volume) in at least one directions beyond the pin point coordinates. Those skilled in the art will appreciate that other methods for defining and recording hot spots may be used in accordance with other embodiments of the invention.

In certain embodiments, the hot spot application module 170 or another program module executed by the terminal 167 may comprise computer-executable instructions for allowing a user to define contact routing rules associated with the defined hot spot(s). In other embodiments, a program module for defining contact routing rules is executed by another network device, such as a web server, and may be accessed via the terminal 167 or another device operated by the user. As another option, default or standardized contact routing rules can be configured (e.g., by a service provider or administrator, etc.) for one or more hot spots. Contact routing rules are used by a contact server 135 to determine how an incoming contact should be routed (i.e., to what location or device) when it is determined that the terminal 167, and thus the user, is inside or outside an associated hot spot.

In certain embodiments, contact routing rules may be specified on a per-contact basis. In other words, a contact routing rule may specify that when the user's mobile terminal is within a particular hot spot, contacts of a first type (e.g., phone calls) are to be routed in a first manner and contacts of a second type (e.g., text messages) are to be routed in a second manner. Contact routing rules may be stored in a database 155 or in the local memory of the API server 145 or contact server 135, or in any other location accessible to the contact server 135. For example, the terminal 167 may communicate contact routing rules to the API server 145, which may pass them to the contact server 135, or to the database server 150 for storage in the database 155.

In other embodiments, contact routing rules may be defined for groups of users. In this context, contact routing rules may be used by a contact server 135 to determine how an incoming contact should be routed when it is determined that one or more terminals 167, and thus users, of a defined group are inside or outside an associated hot spot. For example, if a group of users is defined to include the employees of a company and it is determined that multiple of the employees are within a defined "conference room" hot spot, then a particular contact routing rule may be applied to any contacts directed to those employees. This type of "group" contact routing rule may be specified by an administrator or some other entity responsible for managing contacts for multiple users.

When the contact server 135 receives an incoming contact directed to the user of the terminal 167, the contact server 135 determines whether there are any contact routing rule records associated with the user and, if so, retrieves them. The contact server 135 may retrieve the contact routing rules from the database 155, either directly or via the database server 150 and/or the API server 145, or from any other location where they may be stored. The contact server 135 may then communicate with the API server 135 and/or the terminal 167 to determine whether the terminal 167 is located within one or more hot spots defined by the user, or may retrieve that information from a storage location, such as its own local memory, the local memory of the API server or the database 155. The contact server 135 then routes the contact according to the call rules, based on whether the terminal 167 is within one or more hot spots.

Figure 4:
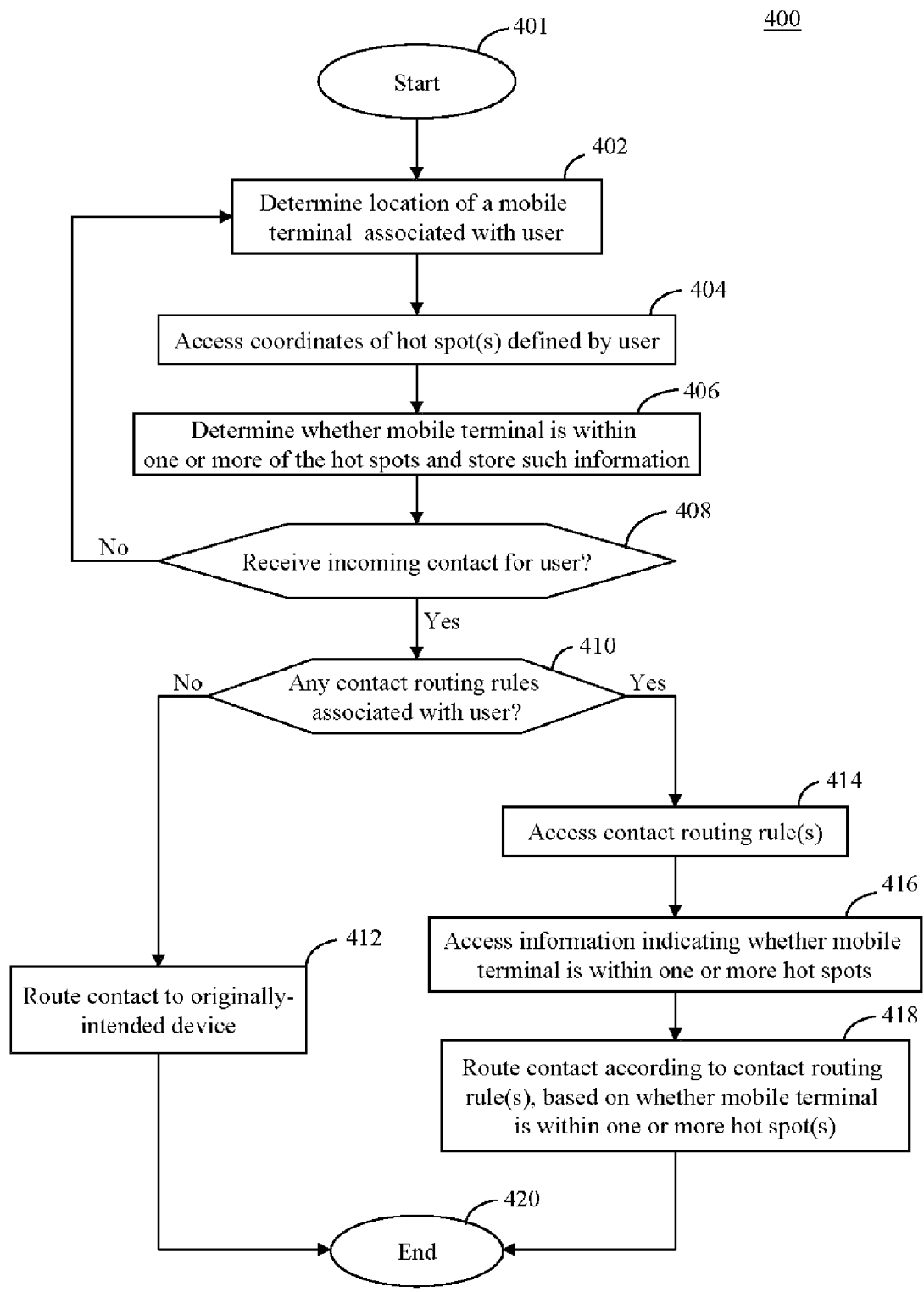
FIG. 4 is a flow chart illustrating an exemplary method for implementing a location based contact routing feature according to an embodiment of the invention.

FIG. 4 is a flow chart illustrating an exemplary method for implementing a location based contact routing feature according to an embodiment of the invention. The method begins at start step 401 and proceeds to step 402, where the location of a mobile terminal associated with a user is determined. By way of example, the location of a mobile terminal may be determined using a location based service, such as GPS, etc. If location based services are not available, the location of the mobile terminal may be determined in other manners as previously described, such as by monitoring signals generated and/or received by the mobile terminal to triangulate the location of the mobile device. Determining the location of the mobile terminal may also include determining the geographical coordinates of the mobile terminal.

At step 404, the coordinates of one or more hot spots defined by the user are accessed. The coordinates of the hot spot(s) may be retrieved from the mobile terminal itself or from another storage location (e.g., API server, database, etc.). Next at step 406, it is determined whether the location of the mobile terminal is within one or more of the hot spots and such information is stored in memory. To determine whether the mobile terminal is located within one or more of the hot spots, the geographic coordinates of the hot spot(s) may be compared to the geographic coordinates of the mobile terminal. Information indicating whether the mobile terminal is within one or more hot spot may be stored in the memory of the mobile terminal or in another storage location (e.g., API server, database, etc.). In some embodiments, the stored information may indicate whether the terminal is within or outside each hot spot that has been defined by the user.

At step 408 a determination is made as to whether an incoming contact has been received for the user of the mobile terminal. If it is determined that no contact has been received for the user, the method returns to step 402 where the location of the mobile terminal is again determined and processing proceeds from that point as previously described. Steps 402-404 may be repeated on a periodic basis and/or in response to a request or command from a contact server, API server or another network device. Alternatively, step 402 may be repeated on a periodic basis and steps 404-406 may be performed only when a change in the location of the terminal is detected. As described, steps 402-404 may be performed by the terminal and/or a combination of network devices, such as servers in an IP network and/or servers in a radio access network.

When it is determined at step 408 that an incoming contact has been received for the user, the method proceeds to step 410 where it is determined whether there are any contact routing rules associated with the user. If it is determined at step 410 that there are no contact routing rules associated with the user, the method advances to step 412 where the contact may be routed to the originally-intended destination (i.e., the device to which it was addressed by the contacting party). However, if it is determined at step 410 that there are one or more contact routing rules associated with the user, the method advances to step 414 where the contact routing rules are accessed. As described, the contact routing rules may be accessed from a database or from the local memory of a contact server or API server. Next at step 416, information indicating whether the mobile terminal is within one or more hot spots is accessed. Again, this information may be accessed from the local memory of a contact server, or may be requested from an API server or the terminal itself. Then at step 418, the contact is routed according to at least one contact routing rule assigned to one or more hot spots, based on whether the mobile terminal is within or outside the one or more hot spots. After the contact is routed at either step 418 or 412, the method ends at step 420.

Many other modifications, features and embodiments of the present invention will become evident to those of skill in the art. For example, the location based contact routing system described herein may be implemented using various other device configurations and network architectures. As another example, it has been assumed herein that the location of a mobile terminal corresponds to the location of the user of the mobile terminal. However, it is of course possible that the user may be in a location that is different from the location of his/her mobile terminal. Additional logic may be implemented (e.g., within the mobile terminal or within one or more network servers) for determining periods of inactivity with respect to the mobile terminal (e.g., no calls, emails, use of application programs, etc.) that exceed a particular threshold and to implement specified or default routing rules for such situations. As a further example, specified or default routing rules may be implemented when it is determined that the mobile terminal associated with a user is not within any hot spots defined by the user. Accordingly, it should be understood that the foregoing relates only to certain embodiments of the invention, which are presented by way of example rather than limitation. Numerous changes may be made to the embodiments described herein without departing from the spirit and scope of the invention.

What is claimed is:

1. A method for location based contact routing in a telecommunications network, the method comprising:
   determining a location of a mobile terminal associated with a user;
   receiving an incoming contact for the user, the incoming contact intended for one of multiple telephone numbers associated with the user;
   determining that the location of the mobile terminal is within a user defined hot spot;
   accessing a record of contact routing rules associated with the user, the record including at least one contact routing rule assigned to the hot spot, the at least one contact rule specifying that the contact is to be routed to a first device associated with a first telephone number and, if the first device does not respond to the contact within a period of time, then the contact is to be routed to a second device associated with a second telephone number; and
   routing the contact to a designated device having the telephone number associated with the contact routing rule for the hot spot.

2. The method of claim 1, wherein the multiple telephone numbers include a combination of home telephone numbers, mobile terminal telephone numbers, work telephone numbers, and other telephone numbers.

3. The method of claim 1, wherein the contact is one of a phone call, video call, a text message, and a multimedia message.

4. The method of claim 1, further comprising manipulating a graphical user interface to define the hot spot.

5. The method of claim 1, further comprising inputting an address and selecting an area or volume that includes the input address to define the hot spot.

6. The method of claim 1, further comprising identifying a pin point on an interactive map and defining an area or volume that includes the pin point to define the hot spot.

7. A contact server for implementing location based contact routing in a telecommunications network comprising:
   a network interface for connecting the contact server to a packet-based network comprising at least a segment of the telecommunications network;

a memory for storing one or more program modules; and a processor for executing the one or more program modules, wherein the one or more program modules comprise computer-executable instructions for causing the contact server to:

determine a location of a mobile terminal associated with a user;

receive an incoming contact for the user, the incoming contact intended for one of multiple telephone numbers associated with the user;

determine that the location of the mobile terminal is within a user defined hot spot;

access a record of contact routing rules associated with the user, the record including at least one contact routing rule assigned to the hot spot, the at least one contact rule specifying that the contact is to be routed to a first device associated with a first telephone number and, if the first device does not respond to the contact within a period of time, then the contact is to be routed to a second device associated with a second telephone number; and route the contact to a designated device having the telephone number associated with the contact routing rule for the hot spot.

8. The contact server of claim 7, wherein the multiple telephone numbers include a combination of home telephone numbers, mobile terminal telephone numbers, work telephone numbers, and other telephone numbers.

9. The contact server of claim 7, wherein the contact is one of a phone call, video call, a text message, and a multimedia message.

10. The contact server of claim 7, wherein the one or more program modules further comprise computer-executable instructions for causing the contact server to manipulate a graphical user interface to define the hot spot.

11. The contact server of claim 7, wherein the one or more program modules further comprise computer-executable instructions for causing the contact server to receive an input of an address and select an area or volume that includes the input address to define the hot spot.

12. The contact server of claim 7, wherein the one or more program modules further comprise computer-executable instructions for causing the contact server to identify a pin point on an interactive map and define an area or volume that includes the pin point to define the hot spot.

13. At least one non-transitory machine-readable medium comprising a set of instructions executable on a computing device to cause the computing device to:

determine a location of a mobile terminal associated with a user;

receive an incoming contact for the user, the incoming contact intended for one of multiple telephone numbers associated with the user;

determine that the location of the mobile terminal is within a user defined hot spot;

access a record of contact routing rules associated with the user, the record including at least one contact routing rule assigned to the hot spot, the at least one contact rule specifying that the contact is to be routed to a first device associated with a first telephone number and, if the first device does not respond to the contact within a period of time, then the contact is to be routed to a second device associated with a second telephone number; and route the contact to a designated device having the telephone number associated with the contact routing rule for the hot spot.

14. The at least one non-transitory machine-readable medium of claim 13, wherein the multiple telephone numbers include a combination of home telephone numbers, mobile terminal telephone numbers, work telephone numbers, and other telephone numbers.

15. The at least one non-transitory machine-readable medium of claim 13, wherein the contact is one of a phone call, video call, a text message, and a multimedia message.

16. The at least one non-transitory machine-readable medium of claim 13, comprising instructions executable on the computing device to cause the computing device to:

manipulate a graphical user interface to define the hot spot.

17. The at least one non-transitory machine-readable medium of claim 13, comprising instructions executable on the computing device to cause the computing device to:

input an address and selecting an area or volume that includes the input address to define the hot spot.

18. The at least one non-transitory machine-readable medium of claim 13, comprising instructions executable on the computing device to cause the computing device to:

identify a pin point on an interactive map and defining an area or volume that includes the pin point to define the hot spot.

* * * * *